United States Patent
Safai et al.

[19]

[11] Patent Number: 6,167,469
[45] Date of Patent: Dec. 26, 2000

[54] DIGITAL CAMERA HAVING DISPLAY DEVICE FOR DISPLAYING GRAPHICAL REPRESENTATION OF USER INPUT AND METHOD FOR TRANSPORTING THE SELECTED DIGITAL IMAGES THEREOF

[75] Inventors: Mohammad A. Safai, Los Altos; Eugene Wang, Palo Alto, both of Calif.

[73] Assignee: Agilent Technologies, Inc., Palo Alto, Calif.

[21] Appl. No.: 09/081,491

[22] Filed: May 18, 1998

[51] Int. Cl.[7] ....................................................... G06F 13/10
[52] U.S. Cl. ..................................... 710/62; 710/3; 710/8;
710/33; 709/217; 709/234; 345/329; 345/349;
348/22; 348/64; 348/157; 348/158; 348/207;
348/211; 348/220; 348/222; 348/231; 348/333;
348/705
[58] Field of Search ............................. 250/369; 282/232;
345/329, 344; 348/17, 22, 64, 157–159,
207, 211, 220, 222, 224, 231–233, 264,
266, 273, 277, 333, 334, 373, 436, 579,
705; 358/1.15, 296, 445, 523; 374/93.17,
93.21; 382/232; 386/38, 96, 120; 396/1,
2, 6, 85, 155, 330, 360, 661; 430/347; 455/3.1,
566; 700/91; 704/270; 707/530; 709/204,
217, 234; 713/176, 179; 710/3, 8, 33, 62

[56] References Cited

U.S. PATENT DOCUMENTS

| | | | |
|---|---|---|---|
| 3,744,390 | 7/1973 | Clark | 396/360 |
| 3,820,133 | 6/1974 | Adorney et al. | 396/1 |
| 3,852,602 | 12/1974 | Gramm et al. | 250/369 |
| 3,864,708 | 2/1975 | Allen | 396/2 |
| 3,974,329 | 8/1976 | Zenzefilis | 348/22 |
| 4,005,261 | 1/1977 | Sato et al. | 348/579 |
| 4,013,876 | 3/1977 | Anstin | 707/530 |
| 4,092,654 | 5/1978 | Alasia | 396/330 |
| 4,097,893 | 6/1978 | Camras | 348/158 |
| 4,423,934 | 1/1984 | Lambeth et al. | 396/661 |
| 4,544,960 | 10/1985 | Konishi | 386/120 |
| 4,546,380 | 10/1985 | Knop | 348/273 |

(List continued on next page.)

FOREIGN PATENT DOCUMENTS 8-98124  4/1996  Japan.

OTHER PUBLICATIONS

Computergram International, "Toshiba Still Camera Has Modem and Software", Aug. 1995.
Ricoh Consumer Products Group—Product Introduction, "Multimedia: Ricoh ships award–winning RDC–1 digital camera that records stills, motion scences & sound; new multimedia device available in photo, computer & consumer electronic retail outlets", Apr. 1996.

Primary Examiner—Thomas C. Lee
Assistant Examiner—Thuan Du

[57] ABSTRACT

A method and apparatus for transporting digital images is provided. In one embodiment, a personal electronic hand-held digital camera executes an application program that enables a user of the camera to send one or more digital images, formed by and stored in the camera, from the camera to a destination. One or more addresses describing one or more destinations are selected or identified. One or more stored digital images are selected and associated with the one or more addresses. Optionally, a voice message is recorded and associated with the one or more addresses. The camera is coupled to a data communication network, and a transport operation is initiated. Under control of the application, the camera sends the selected images to the designated destinations over the data communication network. When an address is a physical address, for example, a postal mail address, the selected images are automatically routed to a central server. At the central server, tangible copies of the selected images are printed, packaged, and sent to the physical address. Each image may be marked with an authentication stamp that uniquely identifies the image or the camera that created the image, guarding against unauthorized alteration.

38 Claims, 13 Drawing Sheets

U.S. PATENT DOCUMENTS

| | | | |
|---|---|---|---|
| 4,587,633 | 5/1986 | Wang et al. | 709/234 |
| 4,591,900 | 5/1986 | Heeb et al. | 348/277 |
| 4,713,686 | 12/1987 | Ozaki et al. | 348/157 |
| 4,811,043 | 3/1989 | Ishimura et al. | 396/155 |
| 4,819,059 | 4/1989 | Pape | 348/220 |
| 4,827,347 | 5/1989 | Bell | 358/224 |
| 4,833,533 | 5/1989 | Augusti et al. | 358/523 |
| 4,939,767 | 7/1990 | Saito et al. | 358/85 |
| 4,985,911 | 1/1991 | Emmons et al. | 348/17 |
| 5,021,811 | 6/1991 | Maurinus et al. | 396/6 |
| 5,042,061 | 8/1991 | Kaneko et al. | 379/53 |
| 5,062,136 | 10/1991 | Gattis et al. | 379/93.21 |
| 5,164,831 | 11/1992 | Kuchta et al. | 348/233 |
| 5,164,982 | 11/1992 | Davis | 379/93.17 |
| 5,185,671 | 2/1993 | Lieberman et al. | 348/229 |
| 5,202,767 | 4/1993 | Dozier et al. | 348/273 |
| 5,264,935 | 11/1993 | Nakajima | 348/705 |
| 5,264,944 | 11/1993 | Takemura | 386/38 |
| 5,282,025 | 1/1994 | Sato | 348/273 |
| 5,402,170 | 3/1995 | Parulski et al. | 348/211 |
| 5,438,359 | 8/1995 | Aoki | 348/207 |
| 5,440,699 | 8/1995 | Farrand et al. | 345/329 |
| 5,466,560 | 11/1995 | Sowinski et al. | 430/347 |
| 5,471,383 | 11/1995 | Gobush et al. | 700/91 |
| 5,477,264 | 12/1995 | Sarbadhikari et al. | 348/231 |
| 5,485,370 | 1/1996 | Moss et al. | 709/217 |
| 5,499,294 | 3/1996 | Friedman | 713/179 |
| 5,500,700 | 3/1996 | Massarsky | 396/2 |
| 5,517,265 | 5/1996 | Zander et al. | 396/6 |
| 5,525,957 | 6/1996 | Tanaka | 348/220 |
| 5,526,046 | 6/1996 | Kondo | 348/220 |
| 5,541,653 | 7/1996 | Peters et al. | 348/264 |
| 5,541,656 | 7/1996 | Kare et al. | 348/334 |
| 5,546,194 | 8/1996 | Ross | 358/445 |
| 5,555,464 | 9/1996 | Hatlestad | 348/266 |
| 5,557,320 | 9/1996 | Krebs | 348/12 |
| 5,576,757 | 11/1996 | Roberts et al. | 348/207 |
| 5,581,299 | 12/1996 | Raney | 348/64 |
| 5,587,928 | 12/1996 | Jones et al. | 709/204 |
| 5,606,365 | 2/1997 | Maurinus et al. | 348/222 |
| 5,659,323 | 8/1997 | Taylor | 348/159 |
| 5,666,159 | 9/1997 | Parulski et al. | 348/211 |
| 5,682,441 | 10/1997 | Ligtenberg et al. | 382/232 |
| 5,696,560 | 12/1997 | Songer | 348/436 |
| 5,696,850 | 12/1997 | Parulski et al. | 348/211 |
| 5,706,097 | 1/1998 | Schelling et al. | 358/296 |
| 5,706,457 | 1/1998 | Dwyer et al. | 345/349 |
| 5,708,856 | 1/1998 | Cloutier | 396/6 |
| 5,710,834 | 1/1998 | Rhoads | 382/232 |
| 5,719,987 | 2/1998 | Kawamura et al. | 386/120 |
| 5,737,491 | 4/1998 | Allen et al. | 704/270 |
| 5,806,005 | 9/1998 | Hull et al. | 455/566 |
| 5,812,736 | 9/1998 | Anderson | 386/96 |
| 5,815,201 | 9/1998 | Hashimoto et al. | 348/232 |
| 5,815,205 | 9/1998 | Hashimoto et al. | 348/373 |
| 5,864,651 | 1/1999 | Lavie et al. | 358/1.15 |
| 5,898,779 | 4/1999 | Squilla et al. | 713/176 |
| 5,903,309 | 5/1999 | Anderson | 348/333 |
| 5,923,908 | 7/1999 | Schrock et al. | 396/85 |
| 5,943,603 | 8/1999 | Parulski et al. | 455/3.1 |
| 6,005,613 | 12/1999 | Endsley et al. | 348/231 |

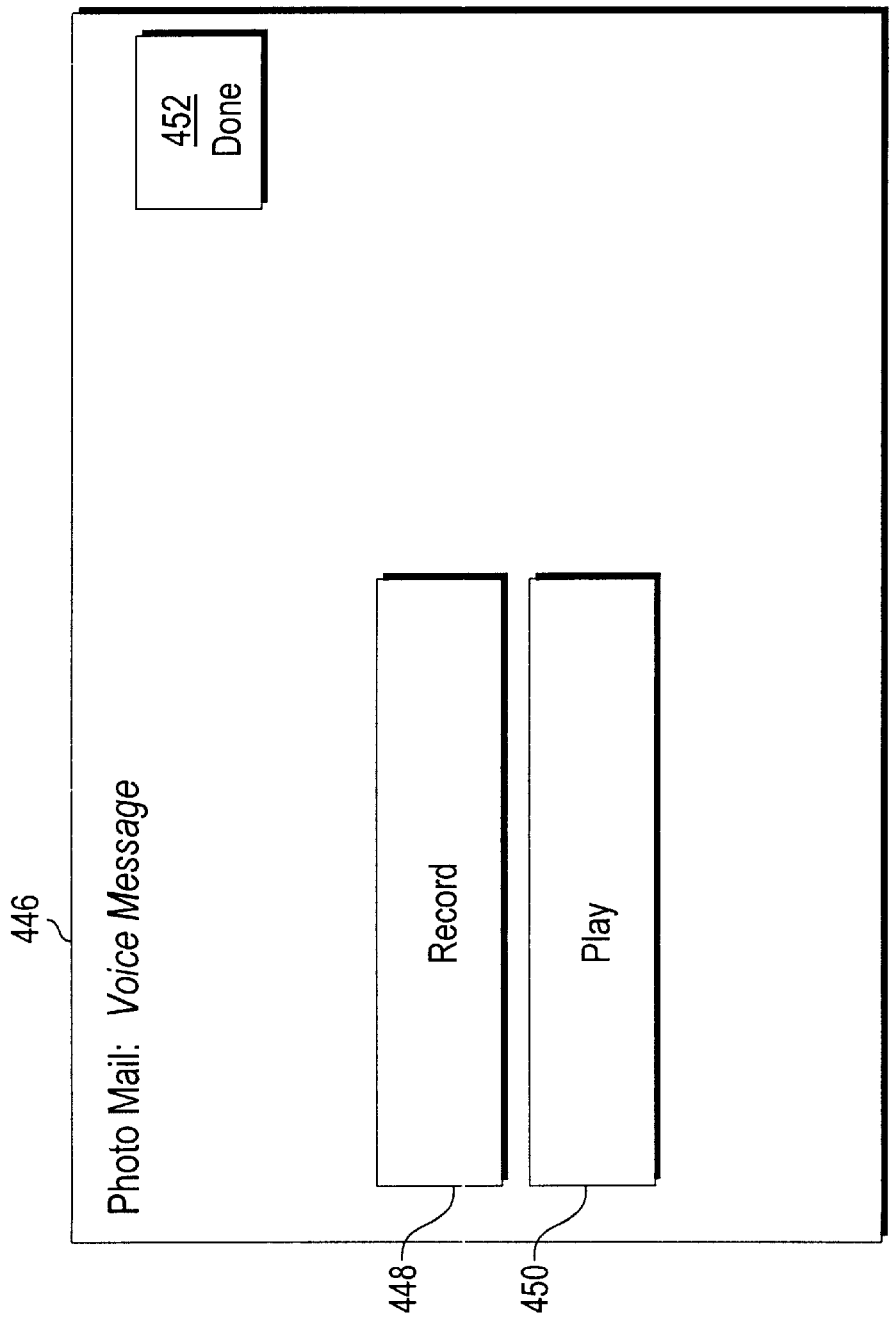

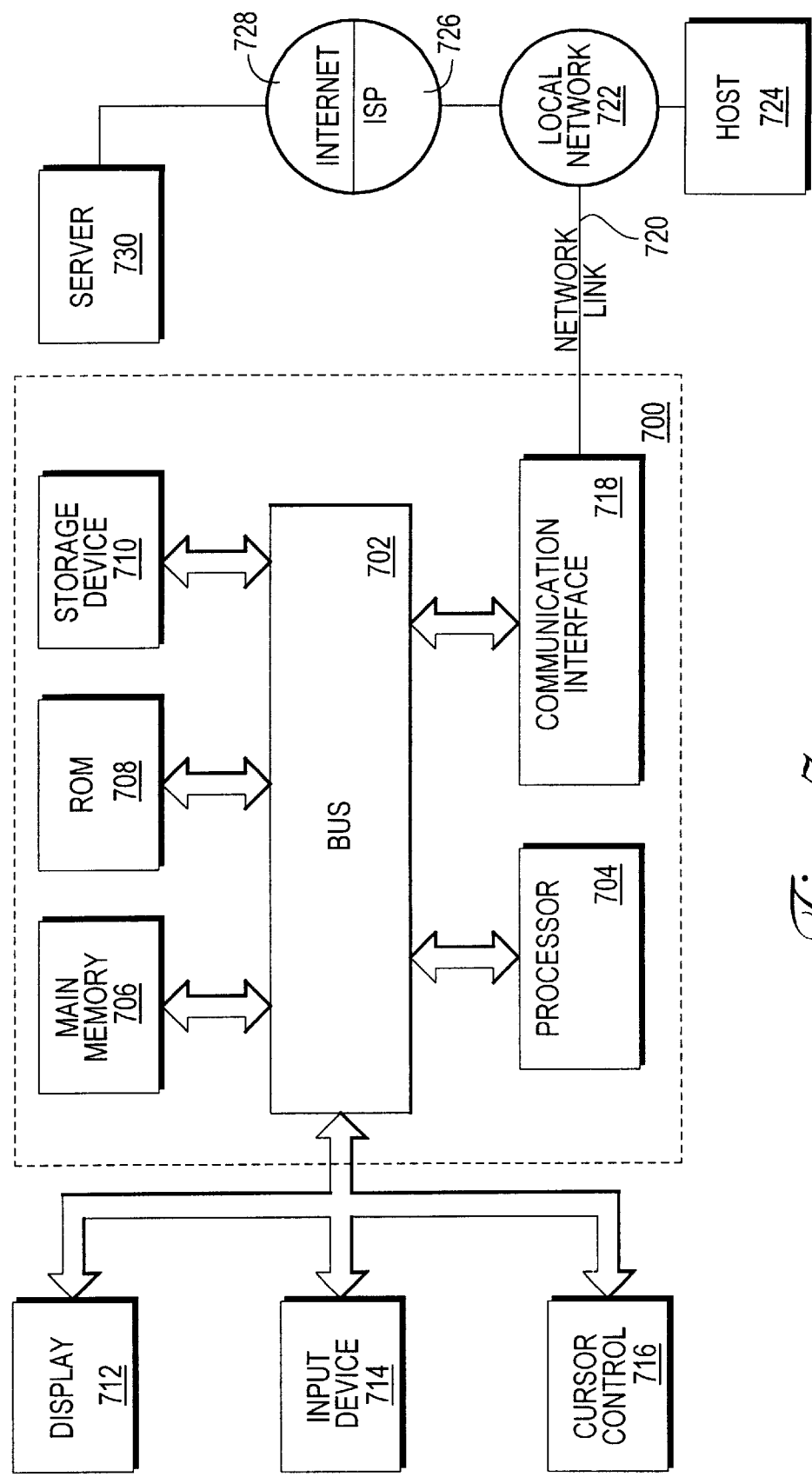

DIGITAL CAMERA HAVING DISPLAY DEVICE FOR DISPLAYING GRAPHICAL REPRESENTATION OF USER INPUT AND METHOD FOR TRANSPORTING THE SELECTED DIGITAL IMAGES THEREOF

FIELD OF THE INVENTION

The present invention relates to transporting digital images that are formed in a digital camera.

BACKGROUND OF THE INVENTION

People around the world enjoy photography and distributing photographic prints to their friends, relatives, and neighbors. Recently, a new generation of cameras has become available that form images using digital technology. Personal electronic handheld digital cameras are now commercially available from Nikon, Canon, and other manufacturers.

In a personal electronic handheld digital camera, light reflected from a subject passes through a lens and strikes a digitizing device, such as a charge-coupled device (CCD) detector. The CCD detector, and associated circuitry, converts light rays into digital electronic signals that form an image of the subject. One or more digital images are stored in a solid-state memory device within the camera or in a removable memory device such as a flash memory card. The camera contains a microprocessor that executes the image formation and storage operations, under control of a computer program embodied in firmware such as read-only memory.

A display integral to the camera, such as a liquid-crystal display (LCD), provides a viewfinder function by showing images formed by the lens and CCD prior to storage. The display also shows status information about various camera settings.

After a picture-taking session, a user of the camera connects the camera to a personal computer. Alternatively, the user removes the removable storage device that contains stored images from the camera, and connects the removable storage device to the personal computer. The personal computer executes a program that can read the stored images, either from the camera or the removable storage device, and display the images on a display of the personal computer. Under software control, the personal computer can also send one or more images to a printer, store the images as files on the personal computer, and carry out other functions.

One problem of this approach is that a user of the digital camera is required to use the personal computer to obtain a reasonable display of the digital images. Generally, personal computers have displays that are far larger and have far better resolution and image quality than the small LCD displays typically found on digital handheld cameras. As a result, using a personal computer is the only practical way to obtain a useful displayed image of a digital image taken with a digital camera.

Another disadvantage of the prior approach is that a personal computer or its equivalent is required to print a tangible copy of a digital image taken with a digital camera; the camera cannot produce a printed copy itself. However, most consumers do not own or cannot afford a high-resolution color printer that is capable of producing a high-quality printed image of a digital photo. Consumer-grade printers can produce a good-quality grayscale image or black-and-white image, but high-resolution color printers are expensive and not common in the home computer environment.

As an alternative, a user of a digital camera can take the removable storage device to a commercial image printing service. Conventional photo developers are beginning to offer such services. The user pays a fee to the service provider, and the service provider prints a hard-copy print of an image, generally using a high-resolution color printer. However, this involves delay and fees that are undesirable. In particular, in this alternative, when a user of the camera wishes to send a tangible copy of an image to a relative, friend, or neighbor, the user is required to wait for the service provider to print the image and deliver it to the user, before the user can send the print to the desired person. There is a need to expedite the image transport process.

A further problem with the prior approaches is that the user of the camera is required to use a personal computer to send a digital image made with the camera to a distant friend, relative or neighbor. Personal computers are not ubiquitous on a worldwide basis or even in large, highly industrialized nations such as the United States. There are millions of people who enjoy taking pictures but do not have access to a personal computer, cannot afford one, or do not want to use one in order to send a picture to someone else. For these people, there is an acute need to simplify and expedite the process of sending pictures from themselves to someone else.

SUMMARY OF THE INVENTION

The foregoing needs, and other needs and objects that will become apparent from the following description, are achieved by the present invention, which comprises, in one aspect, in a digital camera, a method of transporting an image formed by the digital camera, the method comprising the steps of receiving and storing, in the digital camera, at least one address that identifies an addressee to whom the image is to be sent; selecting the image from among one or more stored images that are in the digital camera; and transporting the image from the digital camera to the address. One feature of this aspect involves processing a voice message stored in the digital camera in association with the address; and transporting the voice message to the addressee, in association with the image, using the address.

According to another feature, this aspect further comprises the steps of displaying, in a display device of the digital camera, a graphical representation of a user input device; receiving a user input from the display device; and storing the user input as the address. In another feature, the step of displaying comprises the steps of displaying, in a touch screen display device of the digital camera, a graphical representation of a user input device. In still another feature, the step of displaying comprises the steps of displaying a graphical representation of a keyboard. A related feature is that the step of displaying comprises the steps of displaying a graphical representation of a user input device that includes a graphical representation of a button for requesting entry of a second address. Still another related feature is displaying a graphical representation of a NEXT button for requesting entry of a second address.

According to another feature, the steps of receiving and storing include the steps of receiving an electronic mail address of the addressee. A related feature is that the steps of receiving and storing include the step of receiving a postal mail address of the addressee.

In yet another feature, the steps of selecting the image comprise the steps of displaying one or more stored images that are in the digital camera; and receiving user input that identifies at least one selected image from among the stored images. A related feature involves the steps of marking the selected image with a visual indication that the selected image has been selected.

According to another feature, the method further involves the steps of displaying the one or more stored images in a reduced size format; and displaying the selected image in an enlarged size format. A related feature is that the step of displaying comprises the steps of displaying the one or more stored images using a display device of the digital camera. Still another related feature is that the step of displaying comprises the steps of displaying the one or more stored images using a touchscreen display device of the digital camera, and the step of receiving user input comprise the steps of receiving the user input at the touchscreen display device.

In another feature, the steps of selecting the image further comprises the steps of displaying a user input element; and in response to selection of the user input element, terminating the selecting step. Another feature is that the displaying step comprises the steps of displaying a DONE button; in response to selection of the DONE button, terminating the selecting step.

In another feature, the steps of selecting the image further comprise the steps of displaying a user input element; and in response to selection of the user input element, deleting the image. A related feature is that the displaying step comprises the steps of displaying a TRASH icon; in response to selection of the TRASH icon, deleting the image.

According to still another feature, the steps of processing a voice message comprise the steps of displaying a record initiation icon; in response to selection of the record initiation icon, receiving a voice input at a microphone coupled to the digital camera; converting the voice input into a digital voice file; and storing the digital voice file in the digital camera in association with the address. A related feature is that the steps of processing a voice message further comprise the steps of displaying a playback initiation icon; in response to selection of the playback initiation icon, retrieving a digital voice file from storage in the digital camera; and audibly playing the digital voice file.

According to a related feature, the steps of processing a voice message further comprise the steps of displaying a playback initiation icon; in response to selection of the playback initiation icon, retrieving a digital voice file from storage in the digital camera; and audibly playing the digital voice file.

In another feature, the steps of transporting the image from the digital camera to the address further comprise the steps of connecting the digital camera to a network; sending the image, in association with the address, to a node of the network that is associated with the addressee, over the network. In a related feature, the steps of transporting the image from the digital camera to the address further comprise the steps of connecting the digital camera to a network; sending the image, in association with the address, to a server computer that is coupled to the network; at the server computer, forwarding the image to the addressee based on the address. According to a related feature, the steps of transporting the image from the digital camera to the address further comprise the steps of printing a tangible copy of the image; and sending the tangible copy to the addressee using the address. Another related feature involves sending the tangible copy to the addressee using a common carrier.

In yet another feature, the steps of transporting the image from the digital camera to the address further comprise the steps of uploading the image to a server computer that is identified by the address.

Still another feature relates to generating authentication information relating to the image; and storing the authentication information in the digital camera in association with the image. A related feature is that the step of generating comprises the steps of computing and storing a hash value by applying a one-way hash function to the image. Another related feature is that the step of generating comprises the steps of computing and storing a hash value by applying a one-way hash function to the image and to a key value. In another related feature, generating comprises the steps of computing and storing a unique private key value using a public key cryptography algorithm; and computing and storing a hash value by applying a one-way hash function to the image and to the unique private key value. According to another feature, the step of storing further comprises the steps of storing the authentication information in association with the image during the step of transporting the image from the digital camera to the address.

In yet another related feature, the step of generating includes the step of generating authentication information relating to the image based upon the content of the image, a key value, and information that describes the camera. A variation of this feature is that the step of generating includes the step of generating authentication information relating to the image based upon the content of the image, a key value, and information that describes a user of the camera.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4D is a block diagram of a display generated during a voice message step of the image transport application.

FIG. 7 is a block diagram of a computer system that can be used to implement an embodiment of the invention.

DETAILED DESCRIPTION OF THE PREFERRED EMBODIMENT

A method and apparatus for transporting digital images is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW OF DIGITAL CAMERA ARCHITECTURE

Figure 1:
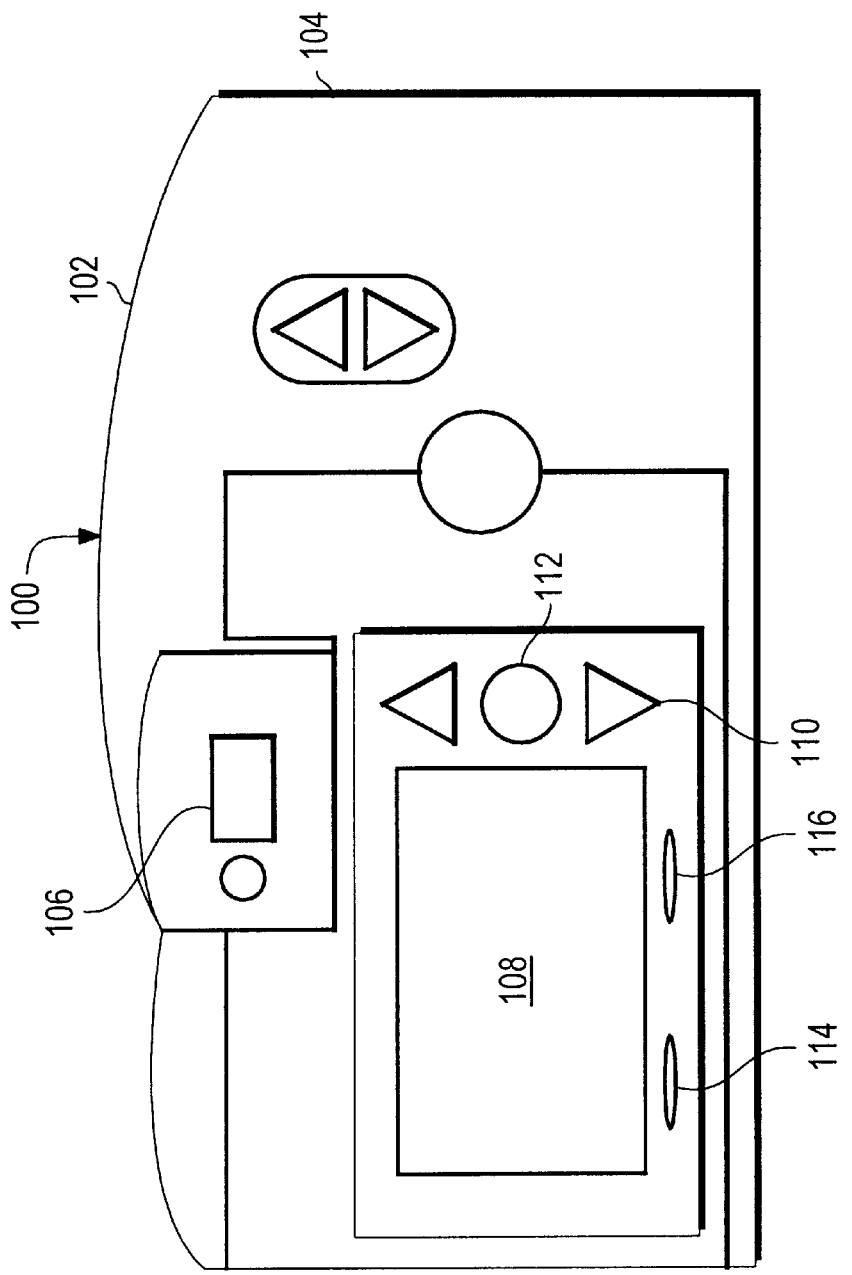
FIG. 1 is a rear elevation view of a personal handheld digital camera.

FIG. 1 is a rear elevation view of a personal handheld digital camera 100. The camera 100 comprises a body 102 generally formed as a rectangular box that can be gripped in the hand using a handgrip 104. A viewfinder 106 is optically coupled to a main lens, so that a user of the camera who wishes to take a picture can look through the viewfinder 106 to line up the shot.

A display device 108 is mounted in the body 102. Stored images and camera settings may be viewed on the display device 108. In one embodiment, the display device 108 is a liquid crystal display (LCD) having a visible area that is approximately 2" (5 cm) in the diagonal dimension. Selection buttons 110, 112, 114, 116 are mounted in the body 102 adjacent to the display 108. The selection buttons 110–116 are used to signal various logical selections of options, commands, etc. based on the contents of the display 108. Use of the buttons 110–116 in the context of transporting digital images is described further below.

Figure 2:
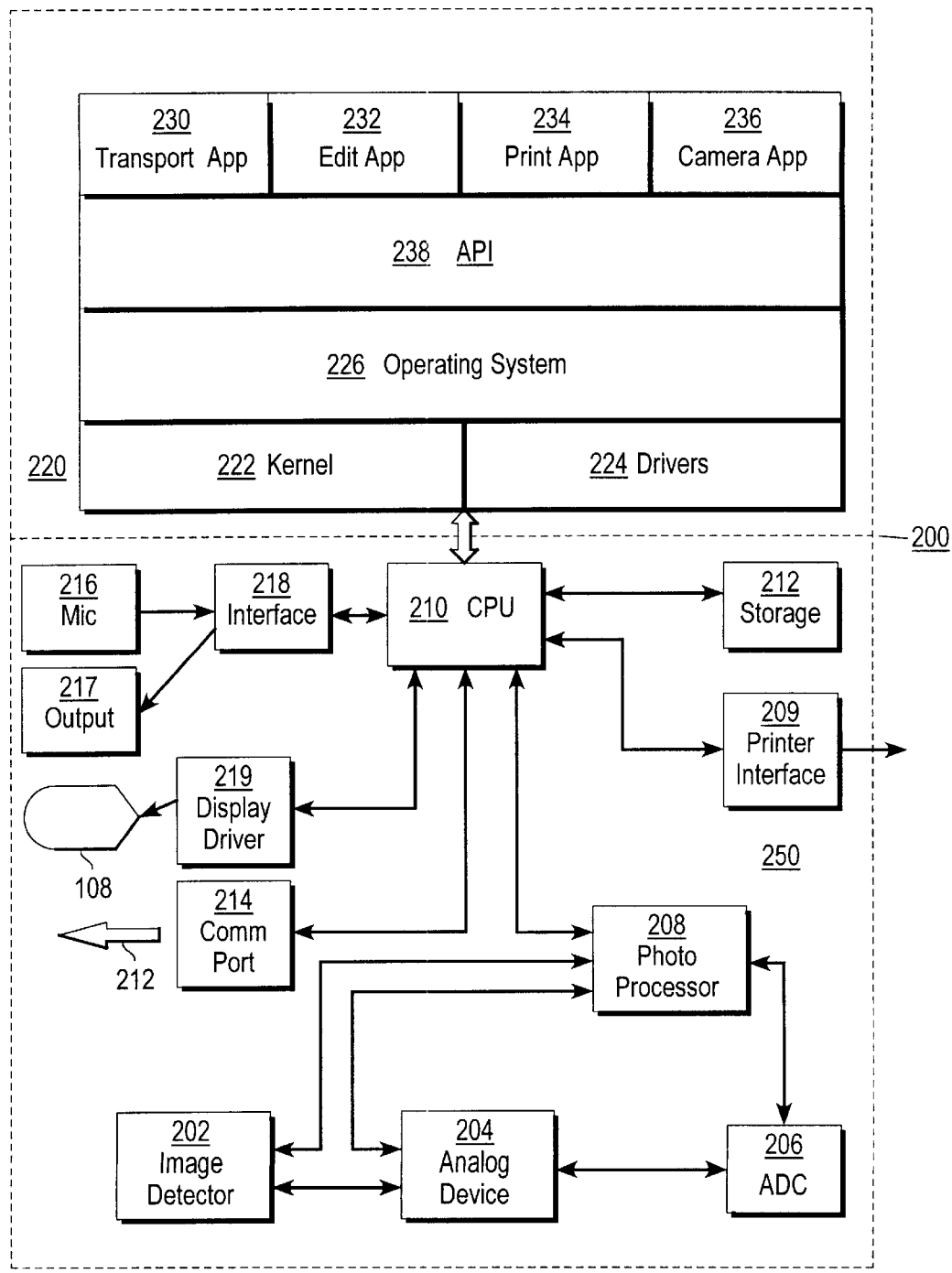
FIG. 2 is a block diagram of selected physical and logical components of a digital camera according to an embodiment.

FIG. 2 is a block diagram of selected physical and logical components of the digital camera 100 according to an embodiment. Architecture 200 of the digital camera 100 comprises certain software elements 220 and hardware elements 250. Among the hardware elements 250, an image detector 202 is optically coupled to a main lens of the camera 100. As in a conventional camera, a shutter is interposed between the main lens and the image detector 202. When the shutter is opened, the image detector 202 receives light reflected from a subject and focused by the lens, and an image is formed at the image detector. An example of an image detector 202 is a charge-coupled device (CCD) that comprises an array of detectors or elements.

The image detector 202 produces a plurality of analog image signals that are generally proportional to the amount of light falling on the elements of the CCD. The analog image signals are coupled to an analog device 204, also called an analog chip or photo color device. The analog device 204 receives the signals from the CCD and organizes them into a discrete set of analog signals in a pre-determined amount. The analog device is coupled to an analog-digital converter (ADC) 206 that receives the analog signals from the analog device 204, and converts the analog signals into a plurality of digital signals. In preferred embodiments, the ADC 206 carries out 8-bit or 12-bit analog-to-digital conversion.

The ADC 206 provides its digital outputs to a photo processor 208. In a preferred embodiment, photo processor 208 is implemented as an application specific integrated circuit (ASIC) device that controls operational parameters of the image detector 202 and the analog device 204. The photo processor 208 may also buffer or groom the digital signals received from the ADC 206 to improve or modify image quality.

The photo processor 208 is coupled to a central processing unit (CPU) 210, which in one embodiment is a microprocessor having a 100 MHz clock cycle. The CPU 210 provides central control for other hardware elements 250 of the architecture 200 and executes software elements 220, as described below. The CPU 210 is coupled to one or more storage devices 212. For example, the CPU 210 is coupled to a flash memory card that provides non-volatile storage of digital images or photos taken by the digital camera.

The CPU is also coupled to input/output devices such as a communications port 214. For example, the CPU 210 is coupled to a telephone line 212 through a modem comprised of a coder/decoder (codec) and digital to analog adapter (DAA). Using the modem, the CPU 210 can communicate data over a conventional telephone line to a remote device such as a server, personal computer or workstation, or printer. A modem is merely one example of a device suitable for use as communications port 214. Alternatively, the communications port 214 is an infrared communications device, an Ethernet interface, an ISDN terminal adapter, or another telecommunications device. The specific communication method, protocol or mode used by communications port 214 is not critical.

In the preferred embodiment, CPU 210 also is coupled to a microphone 216 through an appropriate interface 218. Preferably, the microphone 216 is mounted in or on the body 102 of the camera 100. The interface 218 converts analog voice signals received from the microphone 216 into a digital signal representative of the voice signals. The interface 218 enables the CPU 210 to receive, use and manipulate voice commands or voice message information spoken by a user of the digital camera into the microphone 216. The interface 218 preferably is also coupled to an output device 217. The interface can receive digitized audio information, convert it to analog form, pre-amplify the resulting analog signal, and drive the output device 217. In combination, the interface 218 and output device 217 enable the CPU 210 to play digitized audio files or voice messages in an audible way. The output device 217 is a loudspeaker, or an output connector or jack that can be connected to an amplifier and speaker or to a pair of headphones.

The CPU 210 is also coupled to the display device 108 through a display driver 219. The CPU 210 communicates, to the display driver 219, the form and content of information to be displayed on the display device 108. The display driver 219 determines how to display the information and drives the display device 108, for example, by causing the display device 108 to illuminate pixels of an LCD array at appropriate points. In the preferred embodiment, the display device 108 has a touchscreen formed integrally with the display. In this embodiment, the display driver also includes circuitry or firmware for receiving signals from the touchscreen that represent user selection of elements shown in the display. Alternatively, a separate touchscreen driver circuit or chip is used.

In one embodiment, CPU 210 is also coupled to a printer interface 209 that connects to an external image-quality printer. Using printer interface 209, under program control, CPU 210 can command the printer to print a tangible copy of a stored photo. In the preferred embodiment, printer interface 209 communicates data to the printer using infrared light signals. Of course, any other type of printer interface can be used.

In another alternative embodiment, the CPU 210 is coupled to a hot-pluggable external interface. The hot-pluggable external interface enables the digital camera 100 to be connected to a docking station whereby the digital camera may communicate data and images to external computing devices, such as a personal computer.

The CPU 210 executes software elements 220. In the preferred embodiment, the software elements 220 of the architecture 200 are arranged in several logical levels. At the lowest logical level, the CPU 210 executes a kernel 222 and one or more drivers 224, which cooperate to control and supervise the hardware elements 250. For example, the drivers 224 include a driver program that controls and supervises operation of the image detector 202, the analog device 204, and the photo processor 208.

The CPU 210 executes an operating system 226. The operating system 226 is arranged at a logic level higher than the kernel 222 and drivers 224, so that the operating system 226 can use services embodied in the kernel and drivers. In the preferred embodiment, the operating system 226 is the Microsoft Windows CE operating system.

An application programming interface (API) 228 is logically interposed between the operating system 226 and one or more application programs 230–236. The API 228 provides an application programming interface (API) so that the application programs 230–236 may use services of the operating system 226, kernel 222 and drivers 224 by calling functions organized according to high-level abstractions. In this configuration, the application programs 230–236 are insulated from implementation details or intricacies of the operating system 226, kernel 222 and drivers 224. In the preferred embodiment, the API 228 provides functions accessible through function calls that express abstract program behavior and simplify application program development. For example, the API 228 provides functions for retrieving images, storing images, manipulating image elements, receiving or outputting information, and other functions.

In the preferred embodiment, the CPU 210 executes a transport application 230, an edit application 232, a print application 234, and a camera control application 236. Generally, the transport application 230 provides image transport functions, enabling a user of the digital camera 100 to send one or more stored pictures or images from the camera to one or more external addresses. The edit application 232 provides image editing functions, enabling a user of the digital camera 100 to edit, retouch, or alter one or more stored pictures or images while they are stored in the camera. The print application 234 provides image printing functions, enabling a user of the digital camera 100 to print one or more stored images directly from the camera to a printer. The camera control application 236 provides camera control functions, enabling a user of the digital camera 100 to adjust settings of the camera, such as the exposure time, flash on/off, zoom, whether manual focus or autofocus is enabled, red eye removal, flash fill, exposure intensity, etc. In alternate embodiments, other application programs are executed.

In alternative embodiments, the software elements 220 are implemented in the form of firmware or hardwired circuitry that carries out the functions described herein. Implementation in software in this arrangement is not required.

Figure 3:
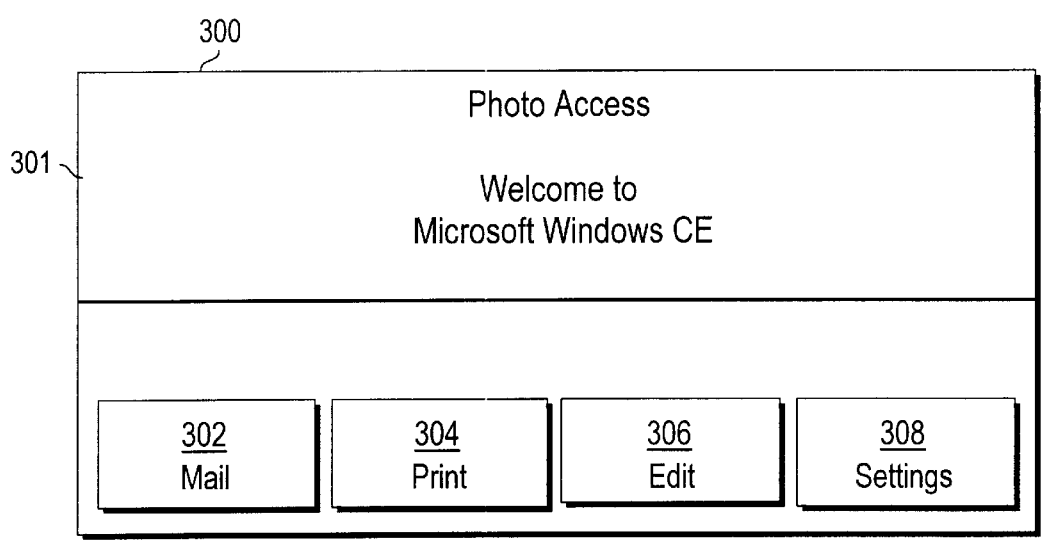
FIG. 3 is a block diagram of a top-level menu of a digital camera application.

Preferably, a user of the digital camera 100 selects and activates one of the application programs 230–236 by choosing an icon representing the desired application program from a display shown on the display device 108. FIG. 3 is a block diagram of a user interface display 300. In the preferred embodiment, when the digital camera 100 is turned on, the CPU 210 executes a bootstrap routine or other programs that result in generating the display 300. Thus, display 300 provides a top-level user interface to the user.

The display 300 comprises a welcome message 301 and application selection icons. Preferably, the icons comprise a Mail icon 302, Print icon 304, Edit icon 306, and Settings icon 308. For purposes of clarity, FIG. 3 represents the icons as text labels. However, the icons may be displayed in pictorial form using pictures that suggest the function of the application program that is accessed using the icon. For example, the Mail icon 302 can comprise a picture of a letter or mailbox.

Each of the icons is used to activate or access one of the application programs 230–236. For example, when a user taps on a region of the touchscreen associated with the Mail icon 302, the transport application 230 is launched and executed by CPU 210. Tapping on the Print icon 304 activates the print application 234. Tapping on the Edit icon 306 activates the edit application 232. Tapping on the Settings icon 308 activates the camera application 236.

IMAGE TRANSPORT APPLICATION AND SERVICE

The transport application 230 is now described with reference to FIG. 4A, FIG. 4B, FIG. 4C, FIG. 4D, FIG. 4E, FIG. 5, and FIG. 6.

Figure 4A:
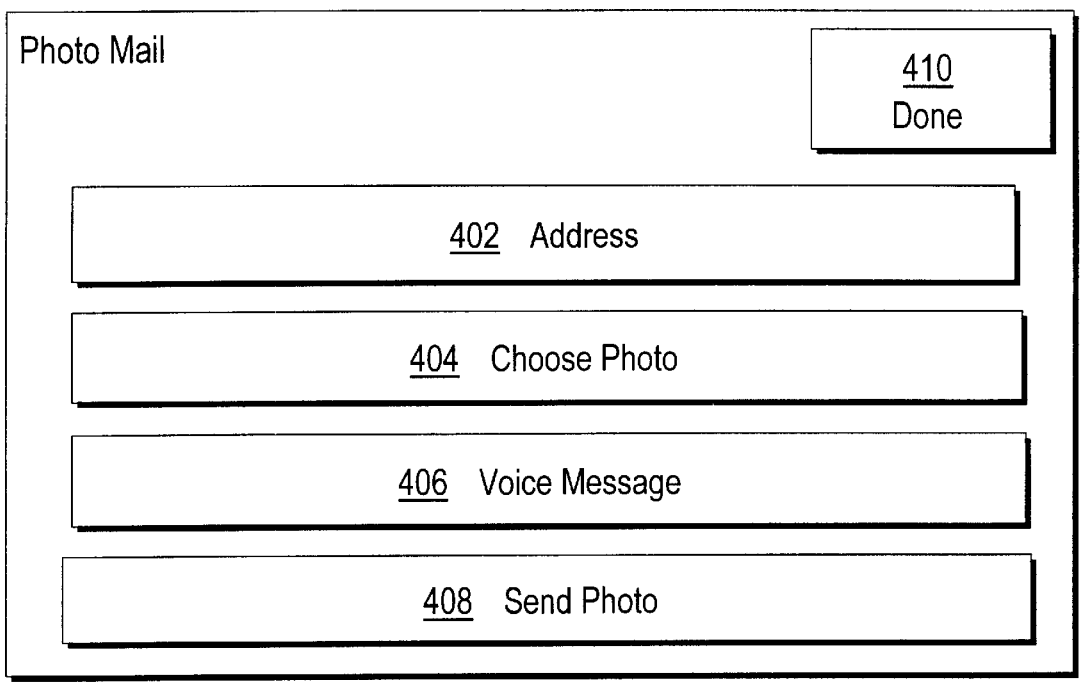
FIG. 4A is a block diagram of a top-level menu of a transport application.
Figure 4B:
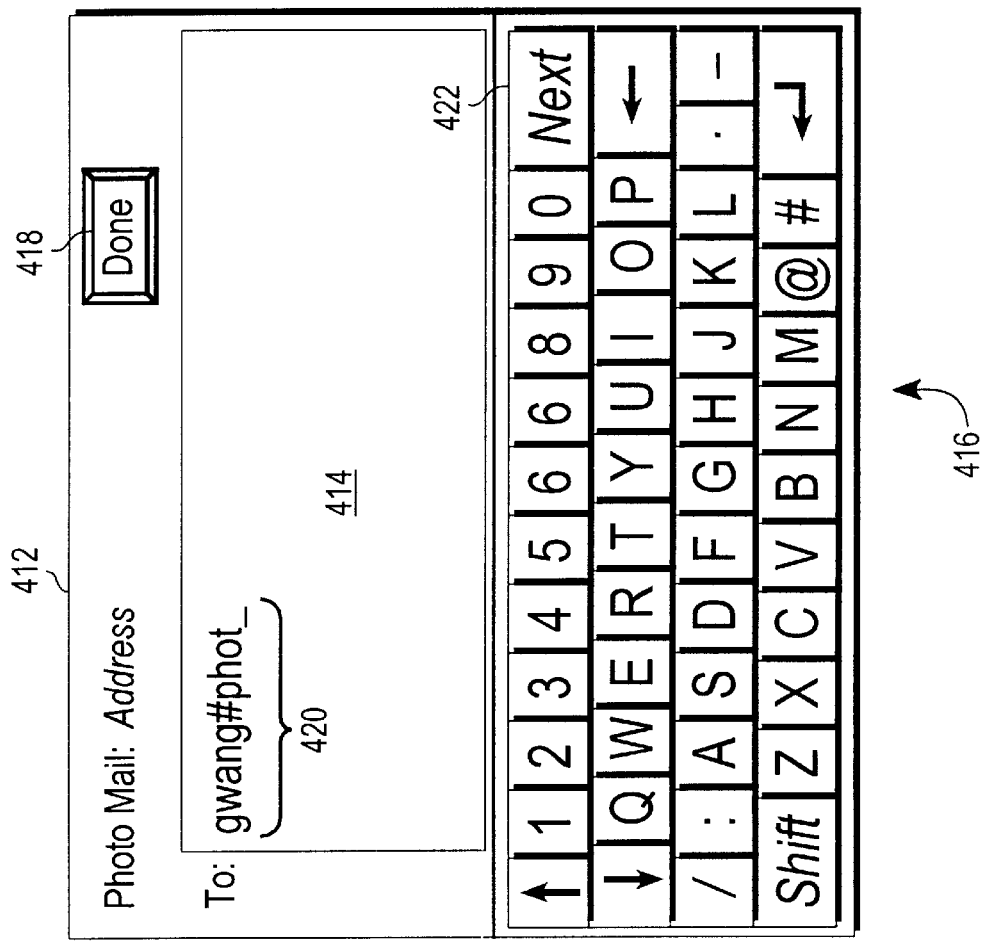
FIG. 4B is a block diagram of a display generated during an addressing step of the image transport application.

FIG. 4A is a block diagram of a top-level menu 400 of an image transport application. In the preferred embodiment, menu 400 is displayed by the CPU 210 on the display device 108 when the transport application 230 is launched from display 300. Thus, menu 400 provides a user of the digital camera with a top-level view of functions available in the transport application 230.

Menu 400 comprises an Address button 402, a Choose Photo button 404, a Voice Message button 406, a Send Photo button 408, and a Done button 410. Each of the buttons 402–410 is used to select or activate a function of the transport application 230 associated with the name or label of the button. In one embodiment, each of the buttons 402–410 is associated with a subroutine or sub-function of the transport application 230 that is called by the CPU 210 when the button is selected or activated.

Figure 5A:
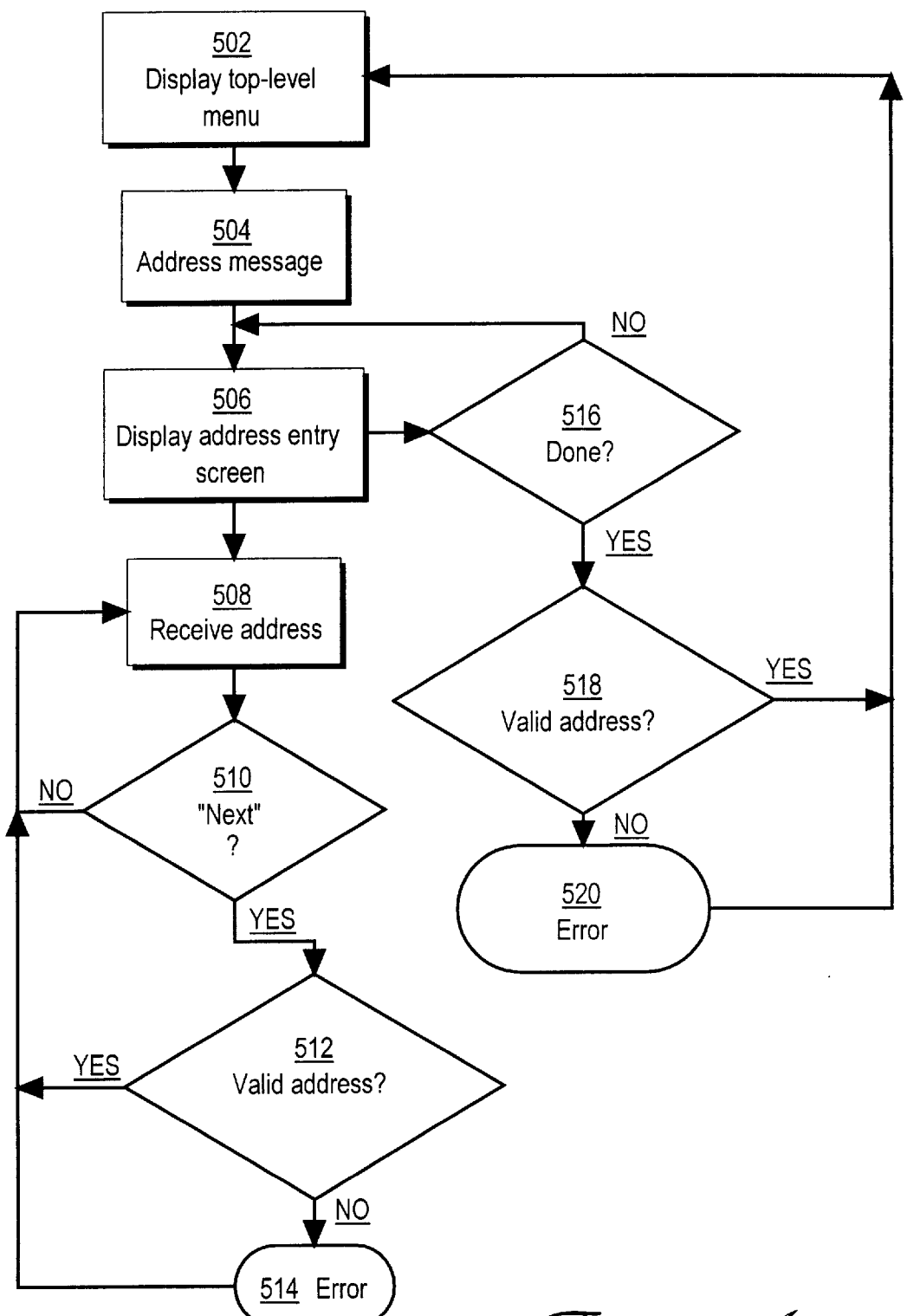
FIG. 5A is a flow diagram of a portion of an image transport application.

FIG. 5 is a flow diagram of an embodiment of the image transport application 230. Operation of the image transport application 230 initiates with displaying the top-level menu 400, as shown by block 502. In block 504, a message is addressed. In one embodiment, block 504 involves responding to a user's selection of the Address button 402. In response, message addressing involves the steps shown in blocks 506–520. Such steps will be described with reference to FIG. 4B, which is a block diagram of a display 412 generated during addressing steps of the image transport application, in one embodiment.

When a user selects the Address button 402, as represented by block 504, in response the transport application 230 displays an address entry screen on the display device 108, as indicated by block 506. In the preferred embodiment, display 412 is shown on the display device 108. Display 412 generally comprises an address entry field 414, a virtual keyboard 416, and a Done button 418. A user of the digital camera specifies an address, to which one or more photos are to be sent, by entering the address in the address entry field 414. The address is entered by touching or pressing one or more keys of the virtual keyboard 416. The virtual keyboard 416 is a graphical representation of an alphanumeric keyboard.

Using keys on the virtual keyboard 416, a user enters letters, numbers and characters of an address 420. The address 420 may be an electronic address, such as an electronic mail address that follows the Internet addressing format. Alternatively, the address 420 is a physical address, such as a postal mail address. Any address format may be provided.

In one embodiment, a user may also enter text describing a subject of the photos or message. In this embodiment, display 412 further includes a subject data entry field next to the address entry field 414. A user may select the subject data entry field by tapping on it with a finger or stylus. In response, transport application 230 displays a cursor in the subject data entry field. The user may enter text for the subject line using the virtual keyboard 416. The transport application 230 displays each character in the subject data entry field as it is entered by the user. When the user selects the DONE button 418, the transport application stores the characters that were entered, for example, in a subject string variable associated with the address.

In another embodiment, the transport application 230 has an auto-completion function. Each time that a user enters an address, the transport application 230 stores the address in an ordered internal table in the storage device 108. As the user subsequently enters an address, the auto-completion function examines the keystrokes or characters. With each keystroke or character, the auto-completion function compares the partial address entered at that point to the addresses in the internal table. If a match occurs, the auto-completion function retrieves the complete address from the internal table and displays it in the address entry field 414.

The transport application 230 receives and stores the address 420, as shown by block 508. When the user has completed entry of the address 420, the user selects either the NEXT button 422 or the DONE button 418 of display 412.

As shown by block 510, when the NEXT button 422 is selected, then in block 512 the transport application tests whether the user-entered address is a valid address. Block 512 may involve various validity checks and tests. For example, block 512 may involve testing whether the address 420 conforms to Internet addressing protocols or whether the address is formatted as a recognizable postal mail address. If the address is found to be invalid, then control passes to block 514, in which an error is reported. If the address is valid, then the address 420 is stored in the storage device 212, for example, in a list of current addresses. Control passes to block 508, in which the user may enter another address. Thus, using the loop formed by blocks 508, 510, and 512, the user may enter and store one or more addresses to which one or more stored images or photos will be sent.

In the preferred embodiment, it is desirable to minimize address validity checking in the transport application. This is because additional validity checking can be carried out in other stages and by other equipment, and because it is desirable to permit the user to enter virtually any type of address, and then use more powerful equipment and processing at another location to interpret or parse the address.

The DONE button 418 is used to terminate an address entry session and return to the main menu 400. In the preferred embodiment, a user may activate the DONE button 418 at any time that the display 412 is visible. As shown in block 516, when the DONE button 418 is selected, in block 518 the transport application tests whether the current address 420 is valid. If so, it is stored in the current address list, and control returns to block 502 and the top-level menu 400 is displayed.

In an alternate embodiment, the DONE button 418 is omitted, and in its place a pair of FORWARD and BACK buttons are displayed. When the FORWARD button is selected by a user, the transport application 230 generates a display showing the next logical step in the message transport process. For example, when the user is addressing a message and activates the FORWARD button, the transport application continues to the "choose photo" function described below in connection with FIG. 5B, or to another next logical step as described below. Activating the BACK button produces the opposite effect; the transport application generates a display showing the previous logical step. In this way, the user never is "lost" in the message transport process. FORWARD and BACK buttons may be provided and used in this manner in any of the screen displays shown herein in which a DONE button appears.

If the current address 420 is not valid in the test of block 518, then an error condition occurs in block 520. In one embodiment, at block 520 the transport application generates a prompt to the user that asks whether the user wishes to correct the address or discard it. This enables the user to "fix" an incomplete or erroneous address before control passes to block 502. Alternatively, the transport application discards the current address 420 and transfers control to block 502. In this alternative, when a user selects DONE with an incomplete address 420 in the address entry field 414, the transport application interprets the user's selection as a "QUIT" command.

Figure 4C:
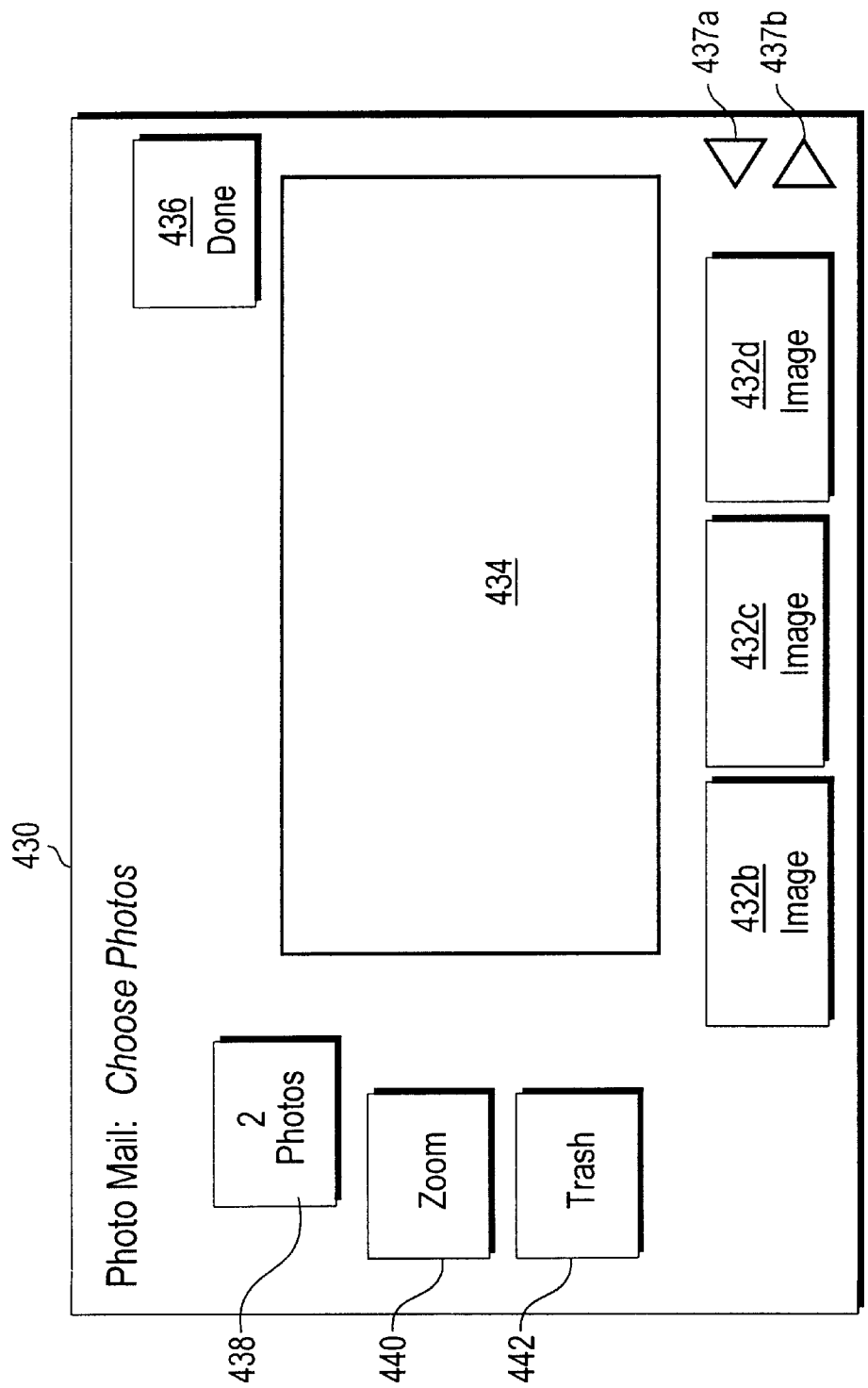
FIG. 4C is a block diagram of a display generated during an image selection step of the image transport application.
Figure 5B:
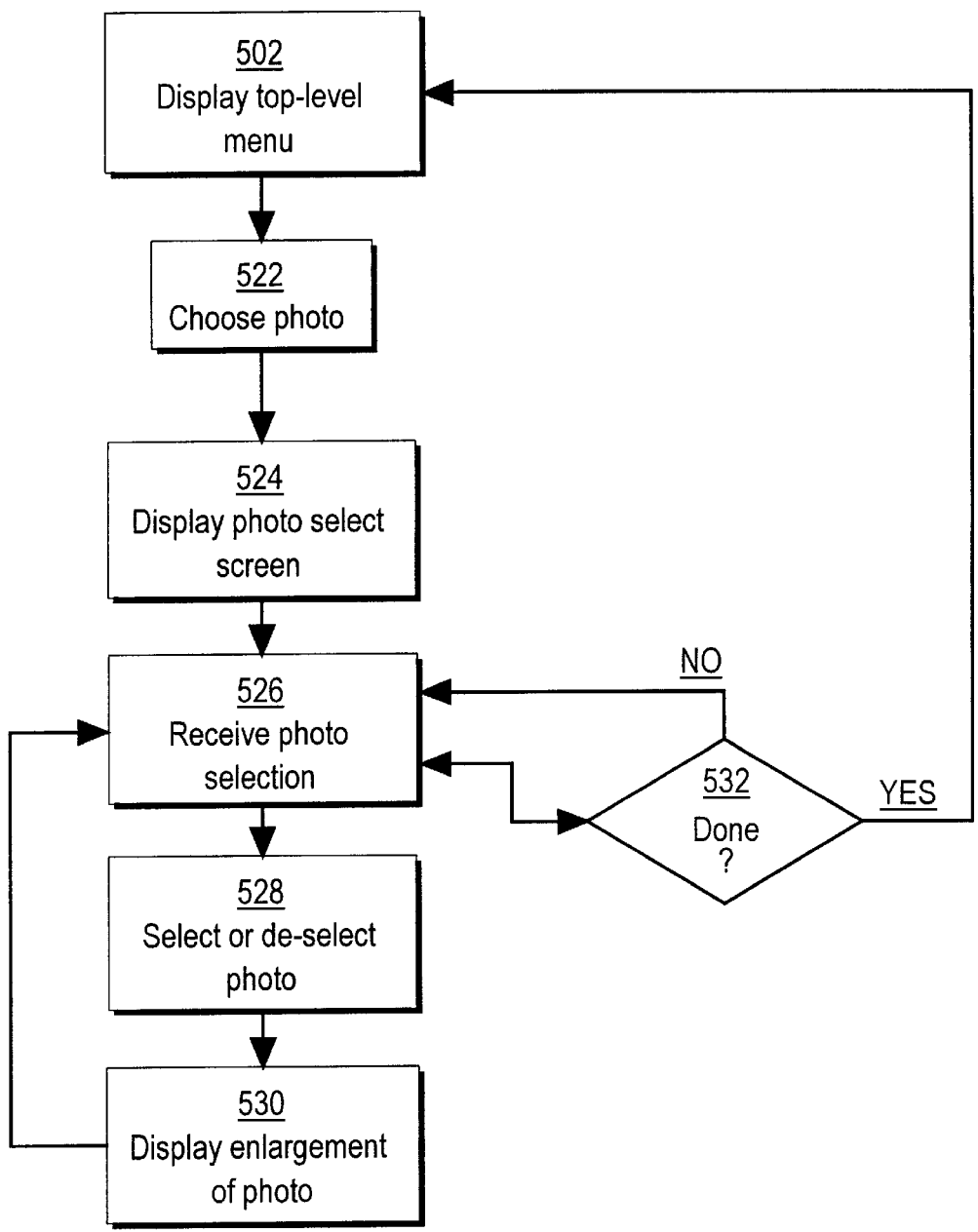
FIG. 5B is a flow diagram of a portion of an image transport application.
Figure 6:
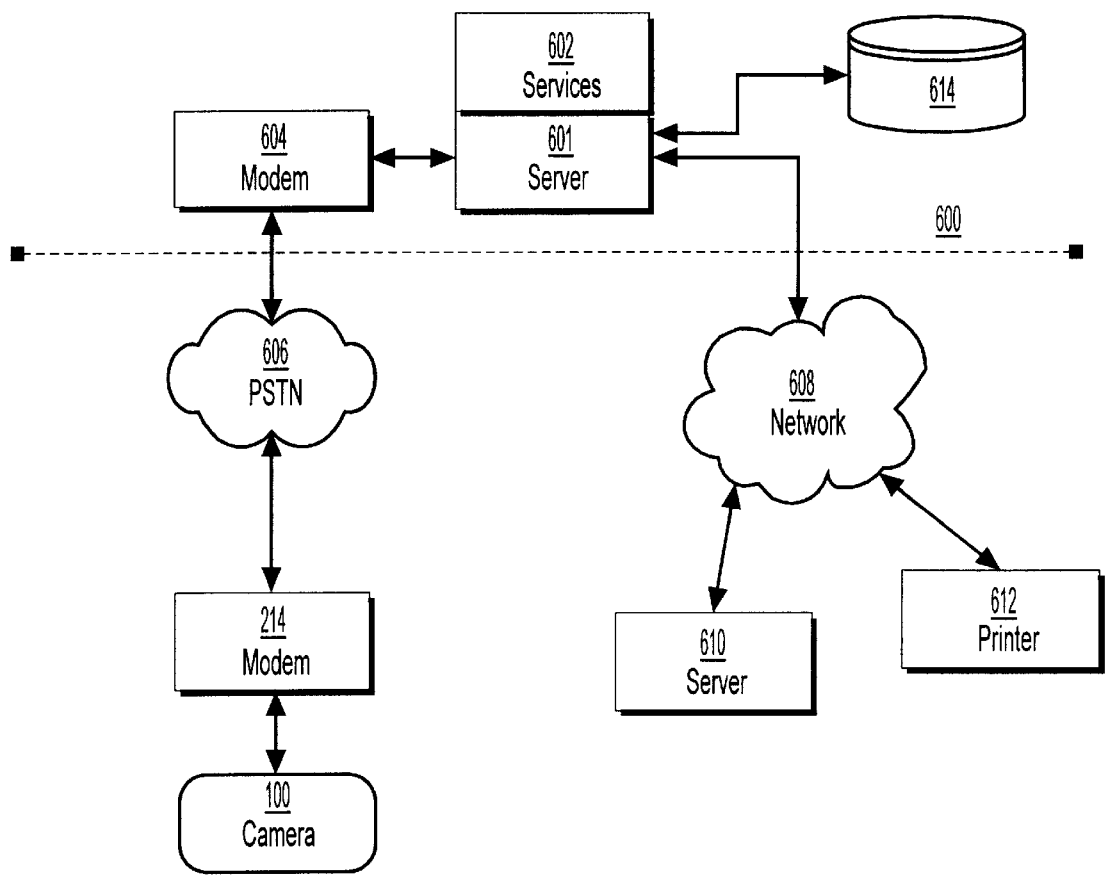
FIG. 6 is a block diagram of an image transport system.

Generally, after entering one or more addresses, a user will next select one or more stored images, such as digital photos, to be sent to the one or more addresses. As shown in FIG. 5B, in block 522 a user selects the Choose Photo button 404 from menu 400. In response, in block 524 the transport application displays a photo select screen. FIG. 4C is a block diagram of a photo select screen 430 that is generated during the image selection step of the image transport application. The photo select screen 430 comprises a plurality of images 432a–432d, each of which is a small-size representation of a previously taken digital photo that is stored in the digital camera 100. Thus, the images 432a–432d comprise "thumbnail" views of photos that are stored in the camera. Although four (4) images 432a–432d are shown in FIG. 4C, this number is not critical, and any number of images can be shown in thumbnail form.

Normally, a digital camera stores a large number of digital images. For example, a digital camera can have a miniature storage device, such as a hard disk drive, mounted in it for image storage. Such disk drives are capable of storing on the order of several hundred images. Since only a few "thumbnail" views of the images can be displayed at a given time, the photo select screen 430 has backward/forward scroll buttons 437a, 437b. When a user selects buttons 437a, 437b, the images 432a–432d conceptually scroll left or right, respectively. This causes one of the images 432a–432d that is at the end of the display to disappear from the screen, and another image from among the stored digital images is displayed in its place.

The photo select screen 430 also has an enlarged image 434 that reproduces one of the images 432a–432d in enlarged form. For example, the enlarged image 434 shows a selected or highlighted image. The enlarged image 434 enables a user of the digital camera to see a more clear view of a particular image.

A DONE button 436 is used to terminate image selection. A counter field 438 displays the current number of images, from among images 432a–432d and others stored in the camera, that have been selected. A ZOOM button or icon 440 enables a user to zoom in on a portion of an image that is displayed as the enlarged image 434. A TRASH button or icon 442 enables a user to delete a selected image from the storage device of the digital camera.

In block 526, the transport application receives a photo selection from the user. In the preferred embodiment, a user taps a finger or stylus on one of the thumbnail images 432a–432d. In response, the transport application selects or deselects the image, as shown in block 528. If the selected image 432a–432d has not been previously selected, then the image is selected. In that case, block 528 preferably involves displaying a colored or highlighted border around the selected image. As shown in block 530, an enlarged copy of the selected image is displayed as the enlarged image 434. The value displayed in the counter field 438 is incremented and re-displayed. An identifier of the selected image is stored in the storage device for later use. Thus, the transport application maintains a stored list of selected images.

Alternatively, if the image chosen by the user is already selected, then in block 528 the image is de-selected. The colored border is turned off, and the value displayed in the counter field 438 is decremented and re-displayed.

When the DONE button 436 is selected, as indicated in block 532, control passes to block 502, in which menu 400 is re-displayed. The stored list of selected images is maintained in the storage device. For example, the selected images are associated with the addresses entered by the user and stored in a data structure, conceptually serving as an "out-box" or output queue, that is maintained in the storage device.

Optionally, a user may record a voice message and associate the recorded voice message with the selected photos and addresses. To record and associate a voice message, the user selects the Voice Message button 406 from menu 400. FIG. 4D is a block diagram of a display 446 generated during a voice message step of the image transport application. The display 446 comprises a Record button 448, a Play button 450, and a DONE button 452. The voice message recorded by the user may be a commentary on one or more images, such as "Hi, Grandma, here are the photos of the grandchildren," or any other desired voice annotation for one or more images.

To record a voice message, the user taps or touches the Record button 448. In response, the transport application 230 begins receiving digitized voice information from the microphone 216 through the interface 218. In one embodiment, the transport application 230 calls one or more functions of the operating system 226 or kernel 222 to obtain digitized voice information from the interface 218. The user speaks into the microphone 216 and speaks any desired message. The digitized voice information is stored in the storage device 212 in association with the list of selected photos and the addresses entered by the user. For example, the digitized voice information is stored in a file in the storage device 212, using the file system provided by the operating system 226, and the name of the file is stored in an object that associates the name, the names of the selected photos, and the addresses.

To play back a recorded voice message, the user taps or touches the Play button 450. In response, the transport application retrieves the previously recorded voice message and plays it back through interface 218 and output device 217.

In the context of a digital camera, it is considered sufficient to record only one voice message and store it in a single area of the storage device. When the Record button 448 is pressed multiple times, successive recordings overwrite previous recordings. In alternate embodiments, multiple recordings can be made separately, named and associated with different sets of selected photos and addresses.

Figure 4E:
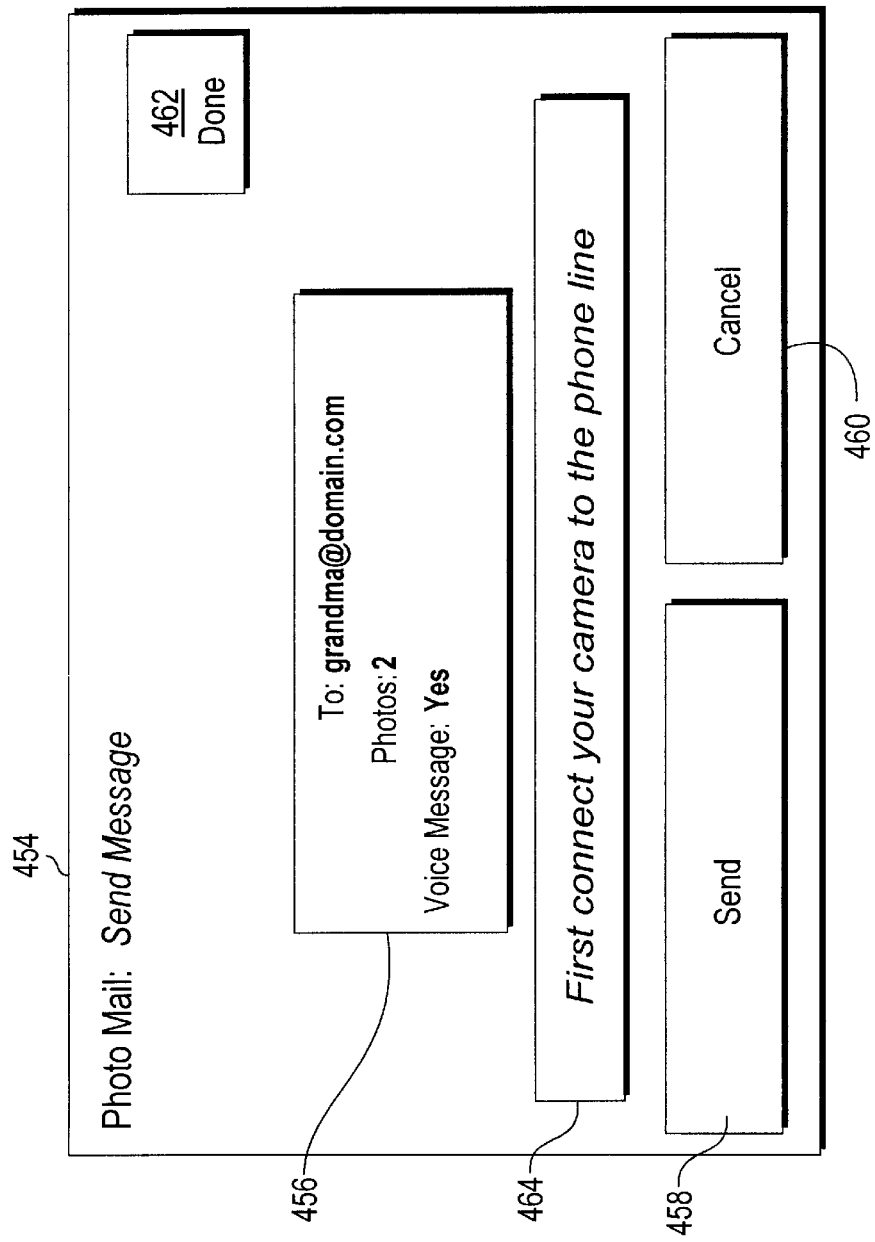
FIG. 4E is a block diagram of a display generated during an image transport step of the image transport application.

After optionally recording a voice message, a user may dispatch the selected images to the entered addresses by selecting the Send Photo button 408. In response, the transport application displays a Send Message screen. FIG. 4E is a block diagram of a Send Message screen 454, comprising a confirmation box 456, message box 464, Send button 458, Cancel button 460, and Done button 462. The confirmation box 456 displays an address, the number of photos to be sent to that address, and an indication whether a voice message is attached. When the user has entered more than one address, the transport application will send the selected photos to each address in the list separately. In that case, each address is displayed in the confirmation box 456 separately.

The message box 464 displays an advisory message informing the user to connect the camera 100 to the phone line 212. In response, the user is expected to connect a cable from the camera to a telecommunication device or network. For example, when communication port 214 is a modem, the user connects it to a telephone jack that is coupled to the public switched telephone network.

The user may select the Send button 458, Cancel button 460, or the Done button 462. When the Cancel button 460 is selected, the send operation terminates and control is passed back to the main menu 400 of FIG. 4A. When the Done button 462 is selected, the send operation also terminates and control is passed back to main menu 400. However, when the camera 100 and image transport application are engaged in actually sending one or more photos to one or more destinations, selecting the Done button 462 has no effect, whereas the Cancel button 460 will interrupt such a sending operation. In the preferred embodiment, the Done button 462 causes a transfer of program control only when all sending operations are complete and the telephone line is on-hook.

Figure 4F:
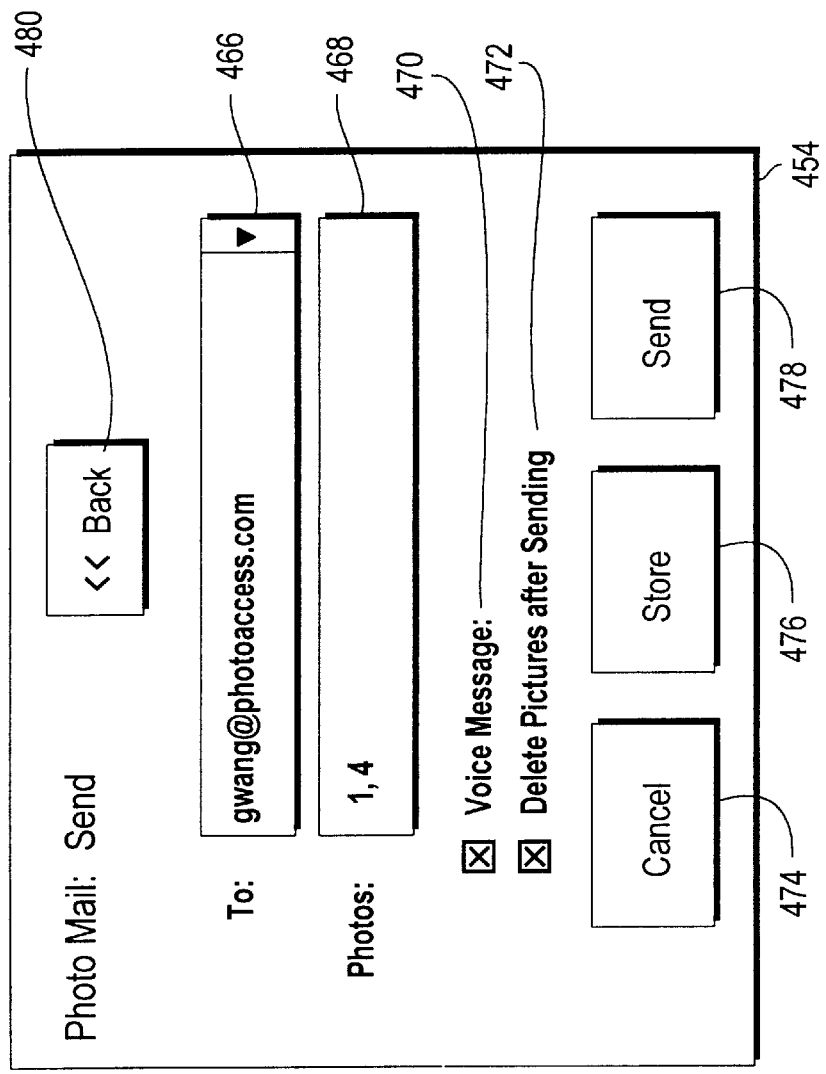
FIG. 4F is a diagram of a display generated during a transport step.

In an alternate embodiment, the Send Message screen 454 has the configuration shown in FIG. 4F. The Send Message screen 454 comprises an address field 466, a photo field 468, a voice message check box 470, a delete option check box 470, a Cancel button 474, a Store button 476, and a Send button 478. In this configuration, the address field 466 displays one or more addresses that have been entered by the user. The photo field 468 displays one or more numeric values that identify the photos that will be sent. Each numeric value identifies the ordinal position of a photo in a sequence of photos that are stored in the camera. For example, FIG. 4F shows values of "1, 4", which identify the first and fourth photos that are stored in the camera 100.

The voice message check box 470 indicates whether the user wishes to transmit a pre-recorded voice message with the photos. When the check box 470 is checked, the transport application 230 will transmit a voice message previously recorded by the user along with the photos identified in the photo field 468. The delete option check box 472 indicates whether the user wishes to delete the photos identified in the photo field 468 from the camera 100 after the photos are sent. When the delete option check box 472 is checked, the transport application deletes the photos from storage in the camera 100 after sending them.

When the Cancel button 474 is activated, the transport application 230 terminates the send operation and returns control to the top-level menu 400. When the Store button 476 is activated, the transport application 230 stores information describing the photos, address, and the state of the check boxes 470, 472 in an Out Box. The Out Box is a data structure in the storage device 212 of the camera 100 that contains a list of messages that have been configured for transmission out of the camera but that have not been sent. In this embodiment, the top-level menu 400 may be provided with a Check Out Box option that enables the user to review the contents of the Out Box, select a message, and resume the transport process.

The Send button 478 is used to transport messages in the manner described below in connection with Send button 458.

When the Send button 458 is selected, in response, the transport application sends the selected photos to the destination address indicated in the confirmation box 456. A preferred process of sending messages will be described in the context of FIG. 6, which is a block diagram of an image transport system. Camera 100 is coupled through its communication port 214, such as a modem, and phone line 212 to the public switched telephone network (PSTN) 606. A service provider 600 is logically separated from camera 100. The service provider 600 has a server 601 that is coupled by a modem 604 to the PSTN 606. One or more services 602 are executed by the server 601. The services 602 preferably include a service of receiving and forwarding photos, as described herein. Other services can be provided, as described below.

PSTN 606 and modem 604 represent just one example of a data communication network and a communications interface that can be used to convey information to server 601. Any data communication network or its equivalent, and an interface or the equivalent that can communicate data to or from communication port 214, may be used.

Preferably, the server 601 is coupled to a mass storage device 614. The server 601 is also coupled to a network 608 and to remote devices that are located logically across the network, such as a remote server 610, a printer 612, and other devices. In the preferred embodiment, the network 608 is the global packet-switched data network known as the Internet.

In this context, when the Send button 458 is pressed, the transport application causes the camera 100 to connect to the server 601. For example, communications port 214 takes the phone line 212 off-hook and dials a predetermined, stored telephone number corresponding to the number of the modem 604. The server 601 answers the call and establishes a connection to the transport application in the camera 100. In an embodiment, one of the services 602 instantiates a process that handles the connection.

The server 601 and the transport application carry out handshaking operations. The server 601 signals the transport application to send photos to it. The transport application sends the selected photos to the server 601, along with the addresses entered by the user and any associated voice message information, in digital form.

In the preferred embodiment, the transport application stores pre-determined information describing the user or owner of the camera 100 in the storage device 108. For example, the user information may comprise a name, address, telephone number, serial number, and passcode. Alternatively, the user information comprises a unique user name and password. In yet another alternative, the user information comprises a public key of the user for use in a public key cryptography process, or a digital signature, or a digital certificate that uniquely identifies the user. The transport application retrieves the user information and sends it to the server 601.

The server 601 receives the user information, photos, addresses, and voice message information, and stores them locally. After all user information, photos and addresses have been received, transport application 230 or one of the other software elements 220 terminates the network connection. Alternatively, or depending on the communication protocol being used, the server 601 terminates the connection. As a result, modem 214 goes on-hook, and in the transport application, the Send Message screen 454 is re-displayed.

Having received the photos, addresses, and voice message information, the server 601 determines what to do with them. In an embodiment, a process of the services 602 examines each address received from the camera 100 and parses the address. When the address is identified as an Internet address in the parsing process, then the service 602 forwards the photos by Internet electronic mail. In particular, the service 602 creates an Internet mail message as a package for the photos. The Internet address is designated as the address for the message. The electronic mail message contains a text greeting identifying the sender. Each digital photo is converted into an image file in a universal file format, such as TIFF, GIF, JPEG, etc. Each image file is attached to the Internet mail message as a file attachment. The service 602 then dispatches the Internet mail message over the network 608.

Alternatively, the photos are subjected to an encoding algorithm, such as Unix-to-Unix encoding (UUENCODE), and incorporated into the electronic mail message in encoded form.

When the address is identified as a physical address such as a postal mail address, the service 602 prepares a tangible copy of each photo and causes the photos to be sent to the physical address. For example, the service 602 converts each photo into a printable format, and sends each photo in that format to a high-resolution color printer. The service 602 also sends a header sheet to the printer. The header sheet identifies the sender (based on the user information), the addressee, the subject of the message or photos if a subject has been entered by the user, and the number of photos. The header sheet is retrieved from the printer along with the tangible copies of the photos. The header sheet is used as a packing slip. The printed photos are packaged in an envelope and mailed to the address indicated on the header sheet.

A system in this configuration may be integrated with a variety of other services. For example, one of the services 602 can redirect one or more photos received from the camera 100 to a facsimile number that is identified in the address information. In this embodiment, the server 601 is coupled to a fax modem. The service 602 parses the addresses received from the transport application and identifies a fax number among the addresses. The service 602 arranges the photos into a fax format file, and passes it to a fax server that controls and supervises the fax modem. The fax server causes the fax modem to dial the fax number and send a fax transmission containing the photos in the fax format file. Details of such fax forwarding technology are well known and are not described in detail herein to avoid obscuring the invention.

In another embodiment, the services 602 are configured to upload the photos received from camera 100 to a designated server or Web site. In this embodiment, upon receipt of user information, addresses, and selected photos, services 602 parse the addresses and identify a Web site address among them, such as a Uniform Resource Locator (URL). In response, services 602 create a Web document, for example, a file in the hypertext markup language (HTML) format. The selected photos are converted into image files, and the image files are hyperlinked into the HTML file. Services 602 establish a connection to the Web site or Web server that is identified in the addresses, through the network 608. For example, services 602 open an anonymous file transfer protocol (FTP) connection to a Web server that is identified in the addresses. Using the FTP connection, services transfer the HTML file and the image files to the Web server. As a result, digital photos taken by the camera 100 become available worldwide, on a rapid basis, through the network 608 using standard World Wide Web protocols and the foregoing processes.

OTHER SERVICES

In this configuration, the server 601 may provide services 602 other than message transport.

For example, services 602 may include a registration service in which an owner or user of a camera 100 may register with the server 601 and establish an account on the storage device 614. The camera owner provides name, address, and billing information, such as a credit card number or bank account number, to the registration service. Thereafter, when the camera owner sends photos from the camera 100 to the services 602 for redistribution to addressees, the server 601 charges the designated credit card number or bank account number a transaction fee for the service of forwarding the message.

Services 602 may also include a photo album maintenance service. In the photo album service, a camera owner registers with the server 601 and receives a unique username and password. The camera owner is entitled to store a fixed number of photos on the storage device 614 associated with the server 601. The camera owner may use the camera 100, under control of the transport application 230 or another application, to upload one or more photos to the camera owner's account and designated photo storage area on the storage device 614. Using the transport application or another application, the camera owner may connect to the server 601, retrieve one or more photos that are stored in the owner's account on the storage device 614, and view the photos at the camera. The camera owner may also print any stored photo at any time and transport any photo at any time in the manner described above in connection with transport application 230. Thus, the storage device 614 and services 602 provide a virtual photo album service to the camera owner.

Services 602 may also include novelty product services. For example, the services 602 may include an image printing service. Using the printing service, one or more photos, stored in the storage device 614 or received from the camera 100 using the transport application 230, are printed on T-shirts, coffee mugs, or other products. The printing operations are carried out upon request by an owner of a camera 100 who has an account registered with the server 601. Completed products are shipped to the owner of the camera 100 at the address that is associated with the owner's account, and the owner is billed by credit card charge or other method.

IMAGE AUTHENTICATION

In a preferred embodiment, the steps carried out in response to selection of the Send Photo button 408 also include an image authentication process.

Preferably, the transport application has an encoding algorithm that can be applied to one or more of the stored images 432a–432d to produce a unique code representative of the image. For example, the transport application has one or more digital signature algorithms that can receive one of the stored images 432a–432d as input, and produce as output a digital signature of the input image. In the preferred embodiment, the digital signature algorithm is a one-way hash algorithm, such as the MD5 algorithm. Digital signature algorithms and one-way hash algorithms are described in detail in B. Schneier, "Applied Cryptography" (2d ed. 1997) (New York: John Wiley & Sons, ISBN 0-471-12845-7).

The encoding algorithm is applied to each photo as the photo exits the camera 100 and is sent to the server 601. Thus, an authenticity stamp in the form of the code is added to each photo upon transmission. If the digital photo is subsequently altered, the code will be invalid. The alteration can be detected by applying the altered image to the same encoding algorithm and comparing the code it generates, and information describing its purported author or source, with the original code attached to the image, and information identifying the author of the image or the camera that produced the image. If the codes do not match exactly, alteration has occurred.

In the preferred embodiment, the encoding algorithm uses a public key cryptography technique. Schneier describes public key cryptography in detail in the above-referenced work. In this configuration, a public key of the server 601 and a public key of the owner of the digital camera 100 are stored at server 601 in association with the owner's account, or information describing the owner or information describing the camera A private key is stored in the camera in a manner that prevents recovery of the private key. For example, the private key is embedded in firmware in the camera. The private key in the camera 100 is used by the transport application 230 as one parameter for the encoding algorithm. Using the private key and the encoding algorithm, the plaintext of an image is converted into ciphertext and then transported to the server 601 in the manner described above. At the server 601, the plaintext of the image can be recovered using the camera owner's public key.

In this embodiment, the encoding algorithm provides a way to associate a particular camera 100 or owner with each image. Thus, using this information, the server 601 or another party can determine not only whether an image is authentic, but can also determine whom or what camera created the image. Moreover, due to the mechanics of public key cryptography, even if the private key in a particular camera is obtained by a malicious party, that private key cannot be used to decrypt or apply a false authentication stamp to image created by other cameras or other persons.

HARDWARE OVERVIEW

FIG. 7 is a block diagram that illustrates a computer system 700 upon which aspects of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for image transport and authentication. According to one embodiment of the invention, image transport and authentication is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CDROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for image transport and authentication as described herein.

The received code may be executed by processor 704 as it is received, and/or stored in storage device 710, or other non-volatile storage for later execution. In this manner, computer system 700 may obtain application code in the form of a carrier wave.

ALTERNATIVES AND EXTENSIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a digital camera, a method of transporting one or more images formed by the digital camera, the method comprising the steps of:

displaying, in a display device of the digital camera, graphical representation of a user input device;

receiving user input from the display device;

storing, in the digital camera, the user input as an address that identifies an addressee to whom the one or more images are to be transported;

selecting the one or more images from among one or more stored images in the digital camera; and transporting the one or more selected images from the digital camera to the addressee using the address.

2. The method recited in claim 1, further comprising the steps of:

processing a voice message stored in the digital camera in association with the address; and transporting the voice message to the addressee, in association with the image, using the address.

3. The method recited in claim 1, in which the step of displaying comprises the step of displaying, in a touch screen display device of the digital camera, a graphical representation of a user input device.

4. The method recited in claim 1, in which the step of displaying comprises the step of displaying a graphical representation of a keyboard.

5. The method recited in claim 1, in which the step of displaying comprises the step of displaying a graphical representation of a user input device that includes a graphical representation of a button for requesting entry of a second address.

6. The method recited in claim 5, in which the step of displaying comprises the step of displaying a graphical representation of a NEXT button for requesting entry of a second address.

7. The method recited in claim 1, in which the steps of receiving and storing include the step of receiving and storing an electronic mail address of the addressee.

8. The method recited in claim 1, in which the steps of receiving and storing include the step of receiving and storing a postal mail address of the addressee.

9. The method recited in claim 1, in which the step of selecting the one or more images comprise the steps of:

displaying the one or more stored images that are in the digital camera; and receiving user input that identifies one or more selected images from among the one or more stored images.

10. The method recited in claim 9, further comprising the steps of marking the one or more selected images with a visual indication that the one or more selected images have been selected.

11. The method recited in claim 9, further comprising the steps of:

displaying the one or more stored images in a reduced size format; and displaying the one or more selected images in an enlarged size format.

12. The method recited in claim 9, in which the step of displaying comprises the step of displaying the one or more stored images using a display device of the digital camera.

13. The method recited in claim 9, in which the step of displaying comprises the steps of displaying the one or more stored images using a touchscreen display device of the digital camera, and the step of receiving user input comprises the step of receiving the user input at the touchscreen display device.

14. The method recited in claim 1, in which the step of selecting one or more images further comprises the steps of:

displaying a user input element; and in response to selection of the user input element, terminating the selecting step.

15. The method recited in claim 4, in which the displaying step comprises the steps of:

displaying a DONE button;

in response to selection of the DONE button, terminating the selecting step.

16. The method recited in claim 1, in which the step of selecting one or more images further comprises the steps of:

displaying a user input element; and in response to selection of the user input element, deleting the one or more images.

17. The method recited in claim 16, in which the displaying step comprises the steps of displaying a TRASH icon; in response to selection of the TRASH icon, deleting the image.

18. The method recited in claim 1, in which the step of processing a voice message comprises the steps of:

displaying a record initiation icon;

in response to selection of the record initiation icon, receiving a voice input at a microphone coupled to the digital camera;

converting the voice input into a digital voice file; and storing the digital voice file in the digital camera in association with the address.

19. The method recited in claim 1, in which the step of processing a voice message further comprise the steps of:

displaying a playback initiation icon;

in response to selection of the playback initiation icon, retrieving a digital voice file from storage in the digital camera; and audibly playing the digital voice file.

20. The method recited in claim 18, in which the step of processing a voice message further comprises the steps of:

displaying a playback initiation icon; in response to selection of the playback initiation icon, retrieving a digital voice file from storage in the digital camera; and audibly playing the digital voice file.

21. The method recited in claim 1, in which the step of transporting one or more images from the digital camera to the addressee using the address further comprise the steps of:

connecting the digital camera to a network;

sending the one or more images to a node of the network that is associated with the addressee, over the network.

22. The method recited in claim 1, in which the step of transporting the one or more images from the digital camera to the addressee using the address further comprise the steps of:

connecting the digital camera to a network;

sending the one or more images to a server computer that is coupled to the network;

at the server computer, forwarding the one or more images to the addressee based on the address.

23. The method recited in claim 1, in which the step of transporting the one or more images from the digital camera to the addressee using the address further comprises the steps of:

printing a tangible copy of the one or more images;

sending the tangible copy of the one or more images to the addressee using the address.

24. The method recited in claim 24, further comprising the step of sending the tangible copy to the addressee using a common carrier.

25. The method recited in claim 1, in which the step of transporting the one or more images from the digital camera to the addressee using the address further comprises the step of uploading the one or more images to a server computer that is identified by the address.

26. The method recited in claim 1, further comprising the steps of:

generating authentication information relating to the one or more images, and storing the authentication information in the digital camera in association with the one or more images.

27. The method recited in claim 26, in which the step of generating comprises the steps of computing and storing a hash value by applying a one-way hash function to the one or more images.

28. The method recited in claim 26, in which the step of generating comprises the steps of computing and storing a hash value by applying a one-way hash function to the one or more images and to a key value.

29. The method recited in claim 26, in which the step of generating comprises the steps of:

computing and storing a unique private key value using a public key cryptography algorithm; and computing and storing a hash value by applying a one-way hash function to the one or more images and to the unique private key value.

30. The method recited in claim 26, in which the step of storing further comprises the step of storing the authentication information in association with the one or more images during the step of transporting the one or more images from the digital camera to the address.

31. The method recited in claim 26, in which the step of generating includes the step of generating authentication information relating to the one or more images based upon the content of the one or more images a key value, and information that describes the camera.

32. The method recited in claim 26, in which the step of generating includes the step of generating authentication information relating to the one or more images based upon the content of the one or more images, a key value, and information that describes a user of the camera.

33. A computer-readable medium carrying one or more sequences of one or more instructions for transporting one or more images formed by a digital camera, wherein execution of the one or more sequences of one or more instructions by one or more processors causes the one or more processors to perform the steps of:

displaying, in a display device of the digital camera, a graphical representation of a user input device;

receiving user input from the display device;

storing, in the digital camera, the user input as an address that identifies an addressee to whom the one or more images are to be transported;

selecting the one or more images from among one or more stored images in the digital camera; and transporting the one or more selected images from the digital camera to the addressee using the address.

34. The computer-readable medium recited in claim 33, wherein the one or more sequences of instructions further comprise the steps of:

processing a voice message stored in the digital camera in association with the address; and transporting the voice message to the addressee, in association with the image, using the address.

35. A computer data signal embodied in the form of a carrier wave, the signal carrying one or more sequences of one or more instructions for transporting one or more images formed by a digital camera, wherein execution of the one or more sequences of one or more instructions by one or more processors causes the one or more processors to perform the steps of:

displaying, in a display device of the digital camera, a graphical representation of a user input device;

receiving user input from the display device;

storing, in the digital camera, the user input as an address that identifies an addressee to whom the one or more images are to be transported;

selecting the one or more images from among one or more stored images in the digital camera; and transporting the one or more selected images from the digital camera to the addressee using the address.

36. The computer data signal recited in claim 35, wherein the one or more sequences of instructions further comprise the steps of:

processing a voice message stored in the digital camera in association with the address; and transporting the voice message to the addressee, in association with the image, using the address.

37. A digital camera comprising:

one or more processors; and a memory communicatively coupled to the one or more processors, wherein the memory includes one or more sequences of one or more instructions for transporting one or more images formed by the digital camera, the one or more sequences of one or more instructions including instructions which, when executed by the one or more processors, cause the one or more processors to perform the steps of:

displaying, in a display device of the digital camera, a graphical representation of a user input device, receiving user input from the display device, storing, in the digital camera, the user input as an address that identifies an addressee to whom the one or more images are to be transported, selecting the one or more images from among one or more stored images in the digital camera, and transporting the one or more selected images from the digital camera to the addressee using the address.

38. A digital camera comprising:

a mechanism for forming one or more images in the digital camera; and a transport mechanism configured to transport the one or more images from the digital camera to another location by:

displaying, in a display device of the digital camera, a graphical representation of a user input device, receiving user input from the display device, storing, in the digital camera, the user input as an address that identifies an addressee to whom the one or more images are to be transported, selecting the one or more images from among one or more stored images in the digital camera, and transporting the one or more selected images from the digital camera to the addressee using the address.

* * * * *